(12) United States Patent
Gong et al.

(10) Patent No.: US 8,192,190 B2
(45) Date of Patent: Jun. 5, 2012

(54) INJECTION MOLD

(75) Inventors: Wen-Peng Gong, Guang-Dong (CN);
Xian-Yun Wang, Guang-Dong (CN);
Xiao-Ping Wu, Guang-Dong (CN);
Shih-Hsiung Ho, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 206 days.

(21) Appl. No.: 12/786,424

(22) Filed: May 24, 2010

(65) Prior Publication Data

US 2011/0287120 A1 Nov. 24, 2011

(51) Int. Cl.
*B29C 70/72* (2006.01)
(52) U.S. Cl. .......................................... 425/125; 249/83
(58) Field of Classification Search .................. 425/116, 425/125, 126.1; 249/83, 95; 264/272.15
See application file for complete search history.

(56) References Cited

U.S. PATENT DOCUMENTS

| | | | | |
|---|---|---|---|---|
| 3,542,328 A | * | 11/1970 | Deitrick | 249/95 |
| 5,174,942 A | * | 12/1992 | Barnadas | 264/272.15 |
| 5,509,794 A | * | 4/1996 | Nakamura et al. | 425/116 |
| 6,370,771 B1 | * | 4/2002 | Huang | 29/883 |
| 7,632,153 B1 | * | 12/2009 | Lai et al. | 439/660 |
| 2010/0025564 A1 | * | 2/2010 | He et al. | 249/187.1 |

* cited by examiner

*Primary Examiner* — Robert B Davis
(74) *Attorney, Agent, or Firm* — Cheng-Ju Chiang

(57) ABSTRACT

An injection mold for molding an insert element which includes a material belt with two belt holes formed therein and a plurality of terminals. Each terminal has a fastening portion with an inserting hole formed therein and a contact portion. The injection mold includes a male mold, a plurality of locating elements, a fastening element, a plurality of locating pieces and a female mold. The male mold has a cavity and a plurality of inserting grooves. Each locating element mounted to the male mold has a locating head extending beyond the male mold for inserting into the belt holes. The fastening element mounted to the cavity has a plurality of fastening grooves for respectively receiving the fastening portions. Each locating piece inserted into the inserting grooves has an inserting portion passing through the inserting hole and supporting the contact portion. The female mold is engaged with the male mold.

8 Claims, 4 Drawing Sheets

INJECTION MOLD

BACKGROUND OF THE INVENTION

1. Field of the Invention

The present invention generally relates to an injection mold, and more particularly to an injection mold with a locating structure.

2. The Related Art

Generally, a conventional process of an insert molding includes the following steps: firstly, mounting an insert element in an injection mold; secondly, injecting a number of thermoplastic resins into the injection mold; thirdly, molding the thermoplastic resins and the insert element integrally and cooled to form a product. The location of the insert element in the injection mold is the most important consideration during the process of insert molding for preventing the product from non-conformance. Especially, as the products renewed continuously and the structures of the products being more and more complicated, the injection mold for molding the non-conformed products needs to be improved accordingly.

Conventionally, an injection mold including a plurality of locating elements and a fastening element is used to mold a product with an insert element. The insert element includes a material belt with two belt holes formed therein, and a plurality of terminals extending from a side of the material belt. Each terminal has a fastening portion. In a process of molding, the locating elements of the injection mold are inserted in the belt holes of the insert element and the insert element is fastened in the fastening element to locate the insert element in the mold. However, as the insert element has an irregular shape and the above-mentioned locating structure is not perfect enough, it's difficult for the insert element to be located firmly in the injection mold so as to cause a movement and a deformation easily during molding.

SUMMARY OF THE INVENTION

An object of the present invention is to provide an injection mold for molding an insert element which includes a material belt, with two belt holes formed therein, and a plurality of terminals extending from a side of the material belt. Each terminal has a fastening portion, and a contact portion folded up the fastening portion and extending obliquely and upwardly. An inserting hole is formed at an end of the fastening portion adjacent to the contact portion. The injection mold includes a male mold, a plurality of locating elements, a fastening element, a plurality of locating pieces and a female mold. The male mold defines a top surface. The top surface has a cavity, and a plurality of abreast inserting grooves located in a front of the cavity. The cavity and the inserting grooves extend upwards and downwards. The inserting grooves are arranged at regular intervals along a longitudinal direction perpendicular to a front-to-rear direction. The locating elements are mounted to the male mold. Each of the locating elements has a locating head extending beyond the top surface for inserting into the belt holes of the material belt. The fastening element is mounted to the cavity. A top of the fastening element has a plurality of spaced fastening grooves for respectively receiving the fastening portions of the terminals. The locating pieces are inserted into the inserting grooves. Each of the locating pieces has an inserting portion which passes through the inserting hole of the fastening portion and supports the contact portion of the terminal. The female mold is engaged with the male mold for locating the insert element.

As described above, when the injection mold is used to mold a product with the insert element, the insert element is firmly fastened in the male mold by means of inserting the locating heads of the locating element in the belt holes to avoid a movement of the insert element, fastening the fastening portions of the terminals in the fastening grooves to avoid a rotation of the insert element, and inserting the inserting portions of the locating pieces in the inserting holes to avoid a rock of the insert element. So that a better molding effect of the product can be achieved.

BRIEF DESCRIPTION OF THE DRAWINGS

The present invention will be apparent to those skilled in the art by reading the following description, with reference to the attached drawings, in which.

DETAILED DESCRIPTION OF THE EMBODIMENT

Figure 1:
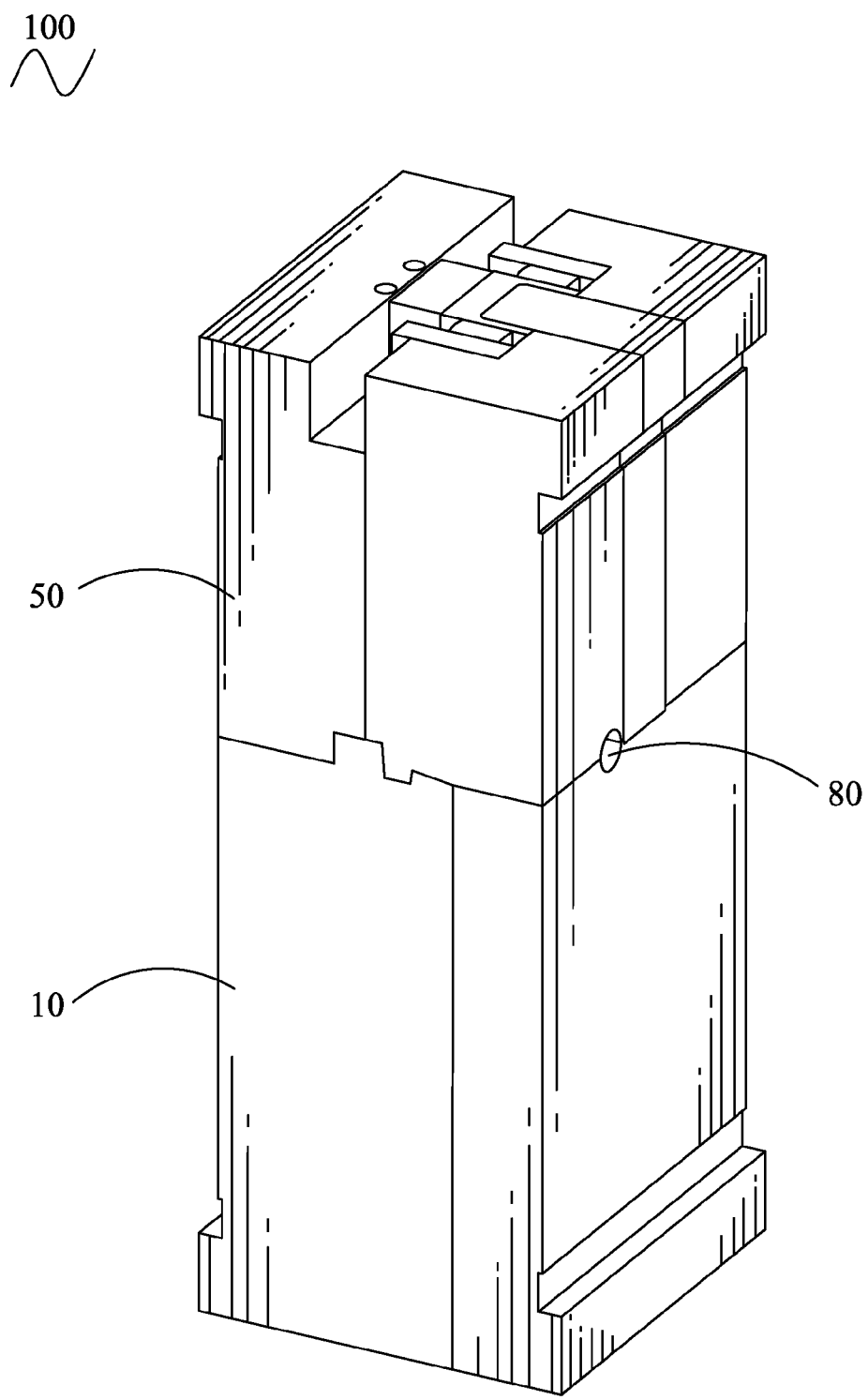
FIG. 1 is a perspective view of an injection mold according to the present invention.
Figure 3:
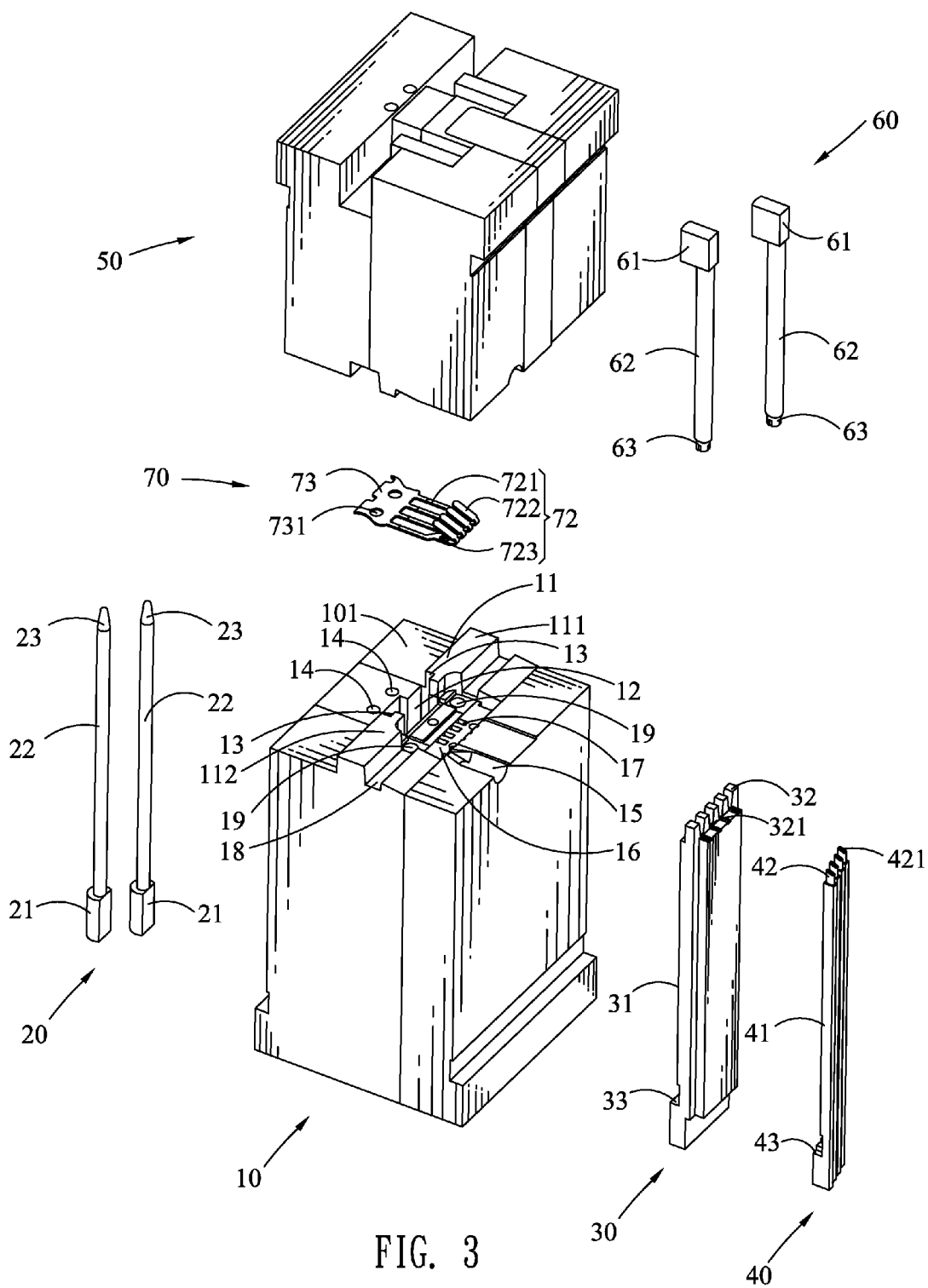
FIG. 3 is an exploded perspective view of the injection mold with the insert element of FIG. 1.

Referring to FIG. 1 and FIG. 3, an injection mold 100 adapted for molding a product including an insert element 70 includes a male mold 10, a plurality of locating elements 20, a fastening element 30, a plurality of locating pieces 40, a female mold 50 and two propping pillars 60. The male mold 10 and the female mold 50 can be engaged with each other to define a chamber (not shown) thereamong.

Figure 2:
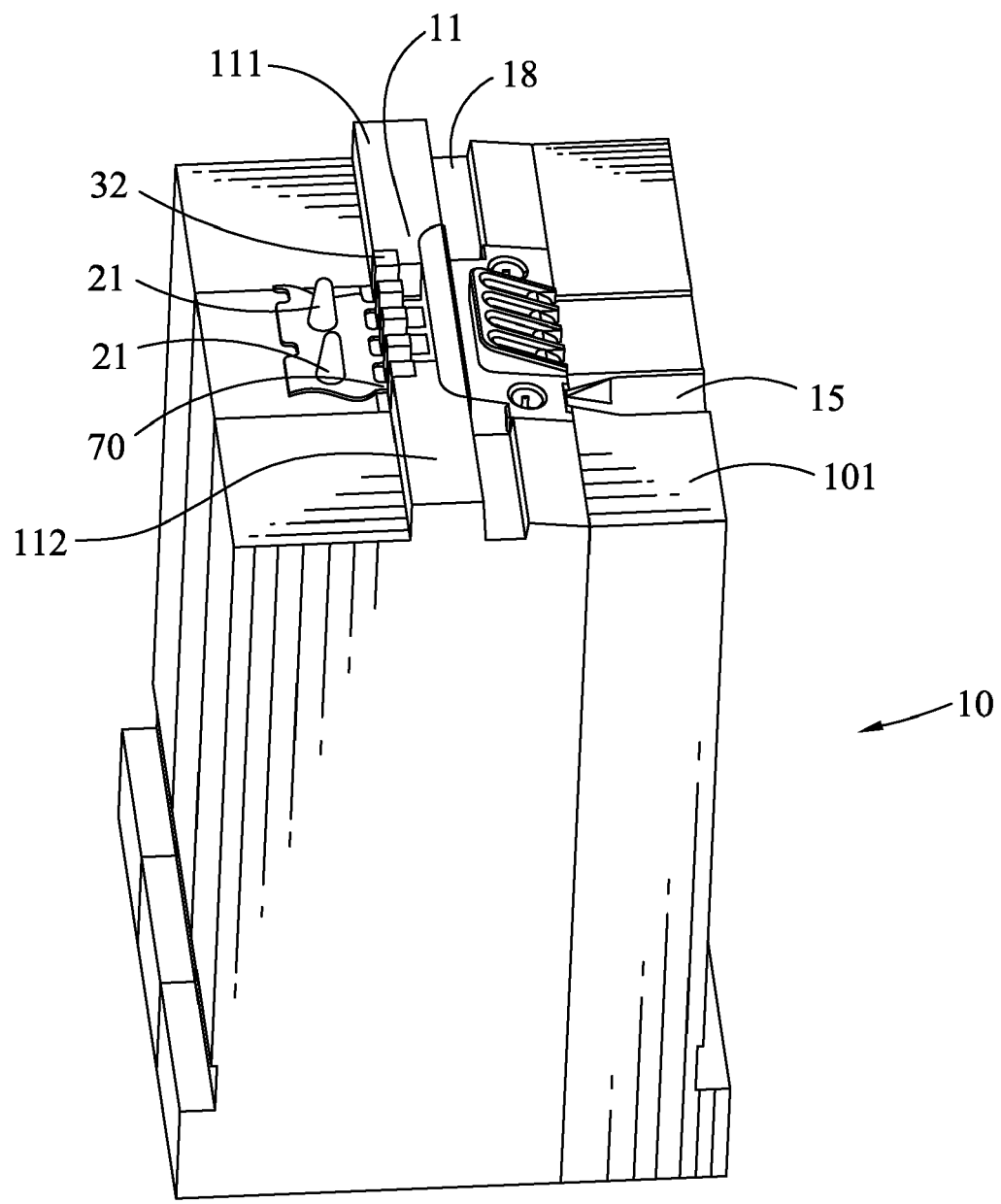
FIG. 2 is a perspective view of a male mold of the injection mold of FIG. 1, wherein an insert element is mounted therein.

Referring to FIGS. 2-3, the male mold 10 is of a cuboid configuration, and defines a top surface 101. A substantial middle of the top surface 101 of the male mold 10 protrudes upward to form a protrusion 11 of bar shape along a longitudinal direction perpendicular to a front-to-rear direction. A middle of a top of the protrusion 11 defines a cavity 12 penetrating downward through the protrusion 11 and the male mold 10. The protrusion 11 is divided into a first protrusion 111 and a second protrusion 112 by the cavity 12. Two rear portions of two opposite ends of the cavity 12 extend oppositely to form two clipping grooves 13. The male mold 10 defines two abreast locating holes 14 at a rear of the top surface 101 thereof and penetrating downward therethrough. A front of the top surface 101 of the male mold 10 is concaved downward to form a male sprue channel 15 passing through a front side of the male mold 10. A middle of the front of the top surface 101 is concaved downward to form a first groove 16 at a rear of the male sprue channel 15. A bottom wall of the first groove 16 defines a plurality of inserting grooves 17 penetrating downward through the male mold 10 and abreast arranged at regular intervals. A rear of the first groove 16 extends rearward, then towards two opposite directions to form a second groove 18. A bottom wall of the second groove 18 abreast defines two pillar holes 19 along the longitudinal direction and penetrating downward through the male mold 10.

Referring to FIG. 3, the locating elements 20 of substantially plane shape can be inserted in the locating holes 14 of the male mold 10. Each locating element 20 has a locating base 21 abutting against a bottom end of the locating hole 14. A top of the locating base 21 extends upward to form a cylindrical locating portion 22 received in the locating hole 14. A top of the locating portion 22 protrudes upward to form a tapered locating head 23 projecting out of the locating hole 14, and exposing beyond the rear of the top surface 101 of the male mold 10.

Referring to FIG. 3, the fastening elements 30 can be mounted in the cavity 12 of the male mold 10. Each of the fastening elements 30 has a fastening body 31 of rectangular plate shape received in the cavity 12. Several portions of a top of the fastening body 31 protrude upward to form a plurality of fastening lumps 32 abreast arranged at regular intervals, with a plurality of fastening grooves 321 formed thereamong. The fastening lumps 32 project out of the cavity 12 with two outermost fastening lumps 32 received in the clipping grooves 13, respectively. Two portions of a lower end of a rear surface of the fastening body 31 protrude rearward to form two propping portions 33 for abutting against an inner sidewall of the male mold 10.

Referring to FIG. 3, the locating pieces 40 can be inserted into the inserting grooves 17 of the male mold 10. Each of the locating pieces 40 has an elongated locating portion 41 received in the inserting groove 17. A top of the locating portion 41 protrudes upward to form an inserting portion 42, with an oblique top surface 421 inclined upward along the front-to-rear direction and projecting out of the inserting grooves 17 to expose beyond the bottom wall of the first groove 16. An end edge of a lower end of the locating portion 41 extends downward, and then is bent rearward to form an L-shaped buckling block 43 for abutting against another inner sidewall of the male mold 10.

Figure 4:
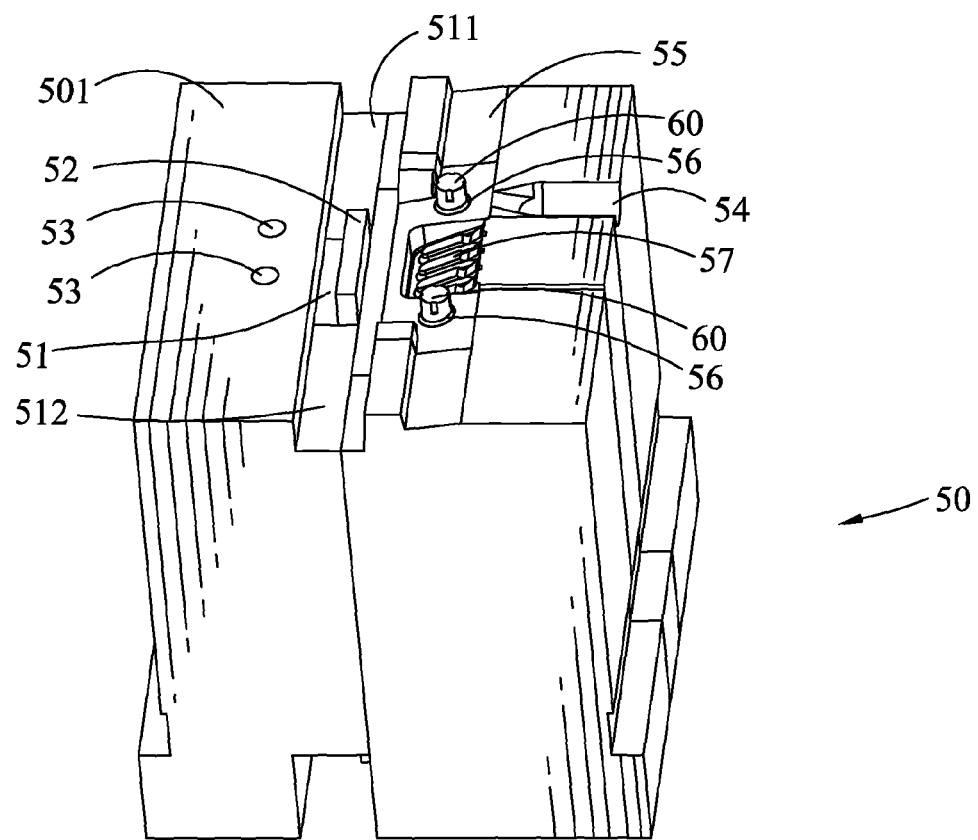
FIG. 4 is a perspective view of a female mold of the injection mold of FIG. 1.

Referring to FIG. 3 and FIG. 4, the female mold 50 is of a cuboid configuration, and defines a bottom surface 501. A substantial middle of the bottom surface 501 of the female mold 50 is concaved upward to form a rectangular receiving groove 51 along the longitudinal direction. A contacting lump 52 is protruded downward from a middle of a bottom wall of the receiving groove 51 and extended along the longitudinal direction. The receiving groove 51 is divided into a first receiving groove 511 for receiving the first protrusion 111, and a second receiving groove 512 for receiving the second protrusion 112 by the contacting lump 52. A rear of the bottom surface 501 of the female mold 50 longitudinally defines two opening holes 53 for receiving the locating heads 23 of the locating elements 20. A front of the bottom surface 501 of the female mold 50 concaves upward to form a female sprue channel 54 passing through a front side of the female mold 50. The front of the bottom surface 501 inclined upward along the front-to-rear direction to form an inclined surface 55 at a rear of the female sprue channel 54. The female mold 50 defines two through-holes 56 abreast disposed on a middle of the inclined surface 55 along the longitudinal direction and penetrating downward therethrough, and a terminal connecting surface 57 inclined upward along the front-to-rear direction and located between the two through-holes 56.

Referring to FIG. 3, the propping pillars 60 are mounted to the through-holes of the female mold 50. Each of the propping pillars 60 has a base portion 61 abutting against an inner sidewall of the female mold 50. A bottom of the base portion 61 extends downward to form a supporting portion 62 received in the through-hole 56. A middle of a bottom of the supporting portion 62 extends downward to form a short-cylindrical pillar head 63 projecting out of the through-hole 56, and exposing beyond the front of the bottom surface 501 of the female mold 50.

Referring to FIG. 3, the insert element 70 includes a material belt 73 with two belt holes 731 formed therein, and a plurality of terminals 72 extending from a side of the material belt 73. Each terminal 72 has a fastening portion 721, and a contact portion 722 folded up the fastening portion 721 and extending obliquely and upwardly. An inserting hole 723 is formed at an end of the fastening portion 721 adjacent to the contact portion 722. The contact portion 722 has a same inclined angle as that of the oblique surface 421 of the inserting portion 42. Each two contact portions 722 have an equal interval therebetween to that between each two fastening grooves 321 of the fastening element 30.

Referring to FIGS. 1-4, in a process of molding, the insert element 70 is mounted in the male mold 10. The locating heads 23 of the locating element 20 are inserted into the belt holes 731 to avoid a movement of the insert element 70. The fastening portions 721 of the terminals 72 are fastened in the fastening grooves 321 to avoid a rotation of the insert element 70. The inserting portions 42 of the locating pieces 40 are inserted in inserting holes 723 with the oblique surfaces 421 of the inserting portions 42 being abutted against bottoms of the contact portions 722 to avoid a rock of the insert element 70. As a result, the insert element 70 can be firmly located in the male mold 10. Then the female mold 50 will be engaged with the male mold 10. The locating heads 23 are inserted into the opening holes 53. The first protrusion 111 and the second protrusion 112 are received in the first receiving groove 511 and the second receiving groove 512, respectively. The contacting lump 52 abuts against the end of the fastening portion 721 adjacent to the material belt 73. Tops of the contact portions 722 respectively abut against the terminal connecting surface 57. The pillar heads 63 of the propping pillars 60 are inserted into the pillar holes 19 of the male mold 10. The male sprue channel 15 and the female sprue channel 54 are integrated to form a sprue channel 80. As a result, the female mold 50 will be firmly mounted on the male mold 10 to locate the insert element 70 in the injection mold 100. Then thermoplastic resins are injected into the injection mold 100 through the sprue channel 80, the thermoplastic resins and the insert element 70 are integrated and solidified for a predetermined time to become a product. At last, move away the female mold 50 to take the product out of the male mold 10, and then cut down the material belt 73 of the insert element 70 by a fixture.

As described above, when the injection mold 100 is used to mold the product with the insert element 70, the insert element 70 is firmly fastened in the male mold 10 by means of inserting the locating heads 23 of the locating element 20 in the belt holes 731 to avoid the movement of the insert element 70, fastening the fastening portions 721 of the terminals 72 in the fastening grooves 321 to avoid the rotation of the insert element 70 and inserting the inserting portions 42 of the locating pieces 40 in the inserting holes 723 to avoid the rock of the insert element 70. So that a better molding effect of the product can be achieved.

What is claimed is:

1. An injection mold for molding an insert element which includes a material belt with two belt holes formed therein, a plurality of terminals extending from a side of the material belt each terminal having a fastening portion, a contact portion folded up the fastening portion and extending obliquely and upwardly, and an inserting hole being formed at an end of the fastening portion adjacent to the contact portion; the injection mold comprising:

a male mold defining a top surface, the top surface having a cavity, and a plurality of abreast inserting grooves located in a front of the cavity, the cavity and the inserting grooves extending upwards and downwards, the inserting grooves being arranged at regular intervals along a longitudinal direction perpendicular to a front-to-rear direction;

a plurality of locating elements mounted to the male mold, each of the locating elements having a locating head extending beyond the top surface for inserting into the belt holes of the material belt;

a fastening element mounted to the cavity, a top of the fastening element having a plurality of spaced fastening grooves for respectively receiving the fastening portions of the terminals;

a plurality of locating pieces inserted into the inserting grooves, each of the locating pieces having an inserting portion which passes through the inserting hole of the fastening portion and supports the contact portion of the terminal; and a female mold engaged with the male mold for locating the insert element.

2. The injection mold as claimed in claim 1, wherein the male mold defines two locating holes at a rear of the top surface and penetrating downwards through the whole male mold, the locating element has a cylindrical locating portion received in the locating hole, a top of the locating portion protrudes upward to form a tapered locating head which projects out of the locating hole for positioning the insert element.

3. The injection mold as claimed in claim 2, wherein the female mold defines two opening holes disposed at a rear of a bottom surface thereof along the longitudinal direction for receiving the locating heads.

4. The injection mold as claimed in claim 1, wherein the female mold defines two through-holes at a front of a bottom surface and penetrating downwards through the whole female mold, the propping pillars has a cylindrical supporting portion received in the through-hole, a middle of a bottom of the supporting portion extends downward to form a short-cylindrical pillar head projecting out of the through-hole, and exposing beyond the bottom surface of the female mold.

5. The injection mold as claimed in claim 4, wherein the male mold defines two pillar holes located at a front of the top surface for receiving the two pillar heads.

6. The injection mold as claimed in claim 1, wherein the top surface is protruded upwards to form a protrusion of substantially bar shape and extending along the longitudinal direction, the cavity is formed at a middle portion of the protrusion.

7. The injection mold as claimed in claim 6, wherein two opposite ends of the cavity have two facing clipping grooves at rear portions thereof, the fastening element of substantially plane shape is restrained by the clipping grooves.

8. The injection mold as claimed in claim 1, wherein a top of the inserting portion is inclined upward along the front-to-rear direction to form an oblique surface, the contact portion has a same inclined angle as that of the oblique surface of the inserting portion.

\* \* \* \* \*